United States Patent
Goldsmith

(10) Patent No.: US 8,233,898 B2
(45) Date of Patent: Jul. 31, 2012

(54) WIRELESS COMMUNICATIONS DEVICE PROVIDING TEMPERATURE-COMPENSATED CLOCK CORRECTION FEATURES AND RELATED METHODS

(75) Inventor: Michael Andrew Goldsmith, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 832 days.

(21) Appl. No.: 11/610,714

(22) Filed: Dec. 14, 2006

(65) Prior Publication Data
US 2008/0144754 A1    Jun. 19, 2008

(51) Int. Cl.
*H04W 24/00* (2009.01)

(52) U.S. Cl. ........ 455/425; 370/252; 370/508; 370/512; 370/516; 370/522; 455/3.02; 455/3.05; 455/427; 455/12.1; 455/98; 455/127.4; 455/144; 455/220; 455/340; 455/276.1; 455/295; 455/262; 455/141; 455/264; 455/256; 375/354; 375/358; 375/362; 375/366; 375/240.27; 375/148; 375/317

(58) Field of Classification Search ................ 370/252, 370/502, 508, 512, 516, 522; 455/425, 3.02, 455/3.05, 427, 12.1, 13.2, 98, 127.4, 144, 455/220, 340, 276.1, 295, 262, 141, 146, 455/264, 256; 375/354, 358, 362, 364, 366, 375/240.27, 148, 317

See application file for complete search history.

(56) References Cited

U.S. PATENT DOCUMENTS

| | | | |
|---|---|---|---|
| 5,172,075 A | 12/1992 | Yerbury et al. | 331/14 |
| 5,663,735 A | 9/1997 | Eshenbach | 342/357 |
| 5,864,315 A | 1/1999 | Welles, II et al. | 342/357 |
| 6,741,842 B2 | 5/2004 | Goldberg et al. | 455/192.2 |
| 6,816,111 B2 * | 11/2004 | Krasner | 342/357.12 |
| 6,928,275 B1 | 8/2005 | Patrick et al. | 455/256 |
| 7,012,563 B1 | 3/2006 | Bustamante et al. | 342/357.1 |
| 7,015,762 B1 * | 3/2006 | Nicholls et al. | 331/10 |
| 7,053,827 B2 | 5/2006 | Awanta | 342/357.15 |
| 7,424,069 B1 * | 9/2008 | Nicholls et al. | 375/339 |
| 2002/0004398 A1 * | 1/2002 | Ogino et al. | 455/456 |
| 2003/0176204 A1 | 9/2003 | Abraham | 455/556.1 |
| 2004/0063411 A1 | 4/2004 | Goldberg et al. | 455/192.2 |
| 2004/0192199 A1 | 9/2004 | Eade | 455/12.1 |
| 2006/0049982 A1 | 3/2006 | Wells | 342/357.1 |
| 2006/0055595 A1 | 3/2006 | Bustamante et al. | 342/357.02 |

* cited by examiner

*Primary Examiner* — Nimesh Patel
(74) *Attorney, Agent, or Firm* — Allen, Dyer, Doppelt, Milbrath & Gilchrist, P.A.

(57) ABSTRACT

A wireless communications device may include a portable housing and a temperature-compensated clock circuit carried by the portable housing. The device may further include a wireless receiver carried by the portable housing for receiving timing signals, when available, from a wireless network, and a satellite positioning clock circuit carried by the portable housing. A clock correction circuit may be carried by the portable housing for correcting the temperature-compensated clock circuit based upon timing signals from the wireless network when available, and storing historical correction values for corresponding temperatures. The clock correction circuit may also correct the temperature-compensated clock circuit based upon the stored historical correction values when timing signals are unavailable from the wireless network, and correct the satellite positioning clock based upon the temperature-compensated clock circuit.

9 Claims, 5 Drawing Sheets

WIRELESS COMMUNICATIONS DEVICE PROVIDING TEMPERATURE-COMPENSATED CLOCK CORRECTION FEATURES AND RELATED METHODS

FIELD OF THE INVENTION

The present invention relates to the field of communications devices, and, more particularly, to mobile wireless communications devices and related methods.

BACKGROUND

Cellular communications systems continue to grow in popularity and have become an integral part of both personal and business communications. Cellular telephones allow users to place and receive voice calls most anywhere they travel. Moreover, as cellular telephone technology has increased, so too has the functionality of cellular devices and the different types of devices available to users. For example, many cellular devices now incorporate personal digital assistant (PDA) features such as calendars, address books, task lists, etc. Moreover, such multi-function devices may also allow users to wirelessly send and receive electronic mail (email) messages and access the Internet via a cellular network and/or a wireless local area network (WLAN), for example.

Another function that has also been recently implemented in some cellular devices is satellite positioning capabilities. By way of example, some cellular devices include not only a cellular transceiver, but also a Global Positioning System (GPS) receiver that receives GPS satellite positioning signals and allows the device to determine its present location. This information can then be used with applications running on the device to advantageously provide the user with desired mapping and/or navigational information, all from the convenience of his cell phone.

Generally speaking, in such configurations the cellular transceiver within the device operates based upon a different clock signal than the GPS receiver. Since the cellular transceiver regularly communicates with a cellular network when turned on, the device has access to timing information from the cellular network that can be used to keep the cellular clock within the device very accurately calibrated. As a result, in some implementations the cellular device clock signal is, in turn, used to help calibrate the GPS clock so that it too can maintain a high degree of accuracy. This approach is called frequency aiding.

One exemplary system which implements a frequency aiding technique for a GPS receiver in a cellular phone is set forth in U.S. Pat. No. 6,741,842 to Goldberg et al. This patent is directed to a frequency management scheme for a hybrid cellular/GPS or other device that generates a local clock signal for the communications portion of the device using a crystal oscillator. The oscillator output is corrected by way of an automatic frequency control (AFC) circuit or software to drive the frequency of that clock signal to a higher accuracy. Besides being delivered to the cellular or other communications portion of the hybrid device, the compensated clock signal may also be delivered to a comparator to measure the offset between the cellular oscillator and the GPS oscillator. The error in the cellular oscillator may be measured from the AFC operation in the cellular portion of the device. An undershoot or overshoot in the delta between the two oscillators may thus be deduced to be due to bias in the GPS oscillator, whose value may then be determined. That value may then be used to adjust Doppler search, bandwidth or other GUPS receiver characteristics to achieve a better Time to First Fix or other performance characteristics.

While such systems may be advantageous for providing more accurate cellular and GPS reference clock signals when timing signals from a cellular network are available, their accuracy may be less than desirable when such timing signals are unavailable. Accordingly, new clock reference configurations may be desirable in such applications.

DETAILED DESCRIPTION

Figure 1:
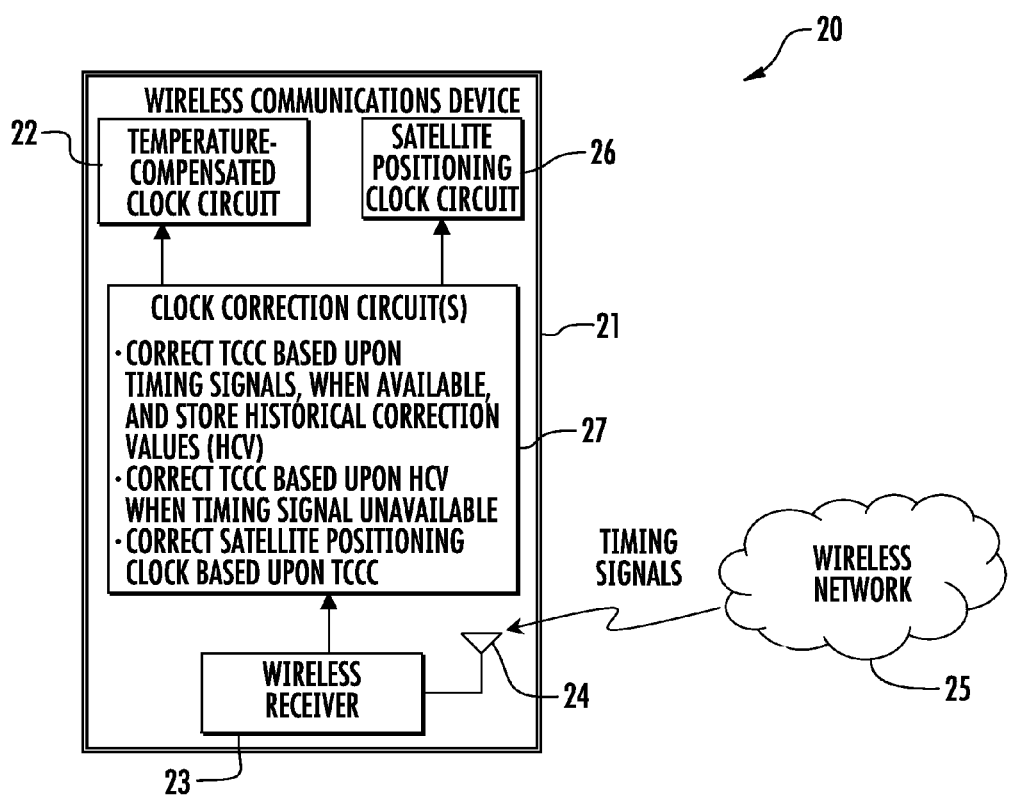
FIG. 1 is a schematic block diagram of a wireless communications device in accordance with one exemplary embodiment including a clock correction circuit for a satellite positioning clock circuit.

The present description is made with reference to the accompanying drawings, in which preferred embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicated similar elements in different embodiments.

Generally speaking, a wireless communications device is disclosed herein which may include a portable housing, and a temperature-compensated clock circuit carried by the portable housing. The device may further include a wireless receiver carried by the portable housing for receiving timing signals, when available, from a wireless network, and a satellite positioning clock circuit carried by the portable housing. In addition, at least one clock correction circuit may be carried by the portable housing for correcting the temperature-compensated clock circuit based upon timing signals from the wireless network when available, and storing historical correction values for corresponding temperatures. The at least one clock correction circuit may also correct the temperature-compensated clock circuit based upon the stored historical correction values when timing signals are unavailable from the wireless network, and correct the satellite positioning clock based upon the temperature-compensated clock circuit.

More particularly, the wireless receiver may be a cellular receiver, for example. The wireless receiver may also be a satellite positioning receiver in some embodiments. Furthermore, the temperature-compensated clock circuit may include a voltage-controlled temperature-compensated clock circuit, and the historical correction values may include voltage correction values for the voltage-controlled temperature-compensated clock circuit.

Additionally, the wireless communications device may further include a temperature sensor carried by the portable housing and connected to the at least one clock correction circuit. Also, the at least one clock correction circuit may include a processor. The satellite positioning clock circuit may include a temperature-compensated crystal oscillator (TCXO), and the device may also include an analog-to-digital converter coupled between the temperature-compensated clock circuit and the at least one clock correction circuit. Furthermore, the device may also include a digital-to-analog converter (DAC) coupled between the at least one clock correction circuit and the temperature-compensated clock circuit.

A clock correction method for a wireless communications device, such as the one described briefly above may include, when timing signals are available from the wireless network, correcting the temperature-compensated clock circuit based upon the timing signals and storing historical correction values for corresponding temperatures. Moreover, when timing signals are unavailable from the wireless network, the method may further include correcting the temperature-compensated clock circuit based upon the stored historical correction values. In addition, the satellite positioning clock circuit may be corrected based upon the temperature-compensated clock circuit.

Referring initially to FIG. 1, a wireless communications system 30 illustratively includes a portable housing 21 and a temperature-compensated clock circuit 22 carried by the portable housing. The device 20 may further include a wireless receiver 23 and associated antenna 24 carried by the portable housing 21 for receiving timing signals, when available, from a wireless network 25. By way of example, the wireless receiver 23 may be a cellular receiver, and the wireless network 25 may be a cellular network. However, in other embodiments, other types of receivers may be used for receiving timing signals from other types of wireless networks, such as a satellite positioning system network, for example, as will be described further below. A wireless local area network (LAN) implementation could be used as well.

The device 20 further illustratively includes a satellite positioning clock circuit 26 carried by the portable housing 21. In addition, at least one clock correction circuit 27 is illustratively carried by the portable housing 21. Generally speaking, the clock correction circuitry 27 is for correcting the temperature-compensated clock circuit 22 based upon timing signals from the wireless network 25, when available, and also storing historical correction values for corresponding temperatures during this time (i.e., while the timing signals are available). Yet, when timing signals are unavailable from the wireless network 25, the clock correction circuitry 27 advantageously corrects the temperature-compensated clock circuit based upon the stored historical correction values, and corrects the satellite positioning clock accordingly.

Figure 2:
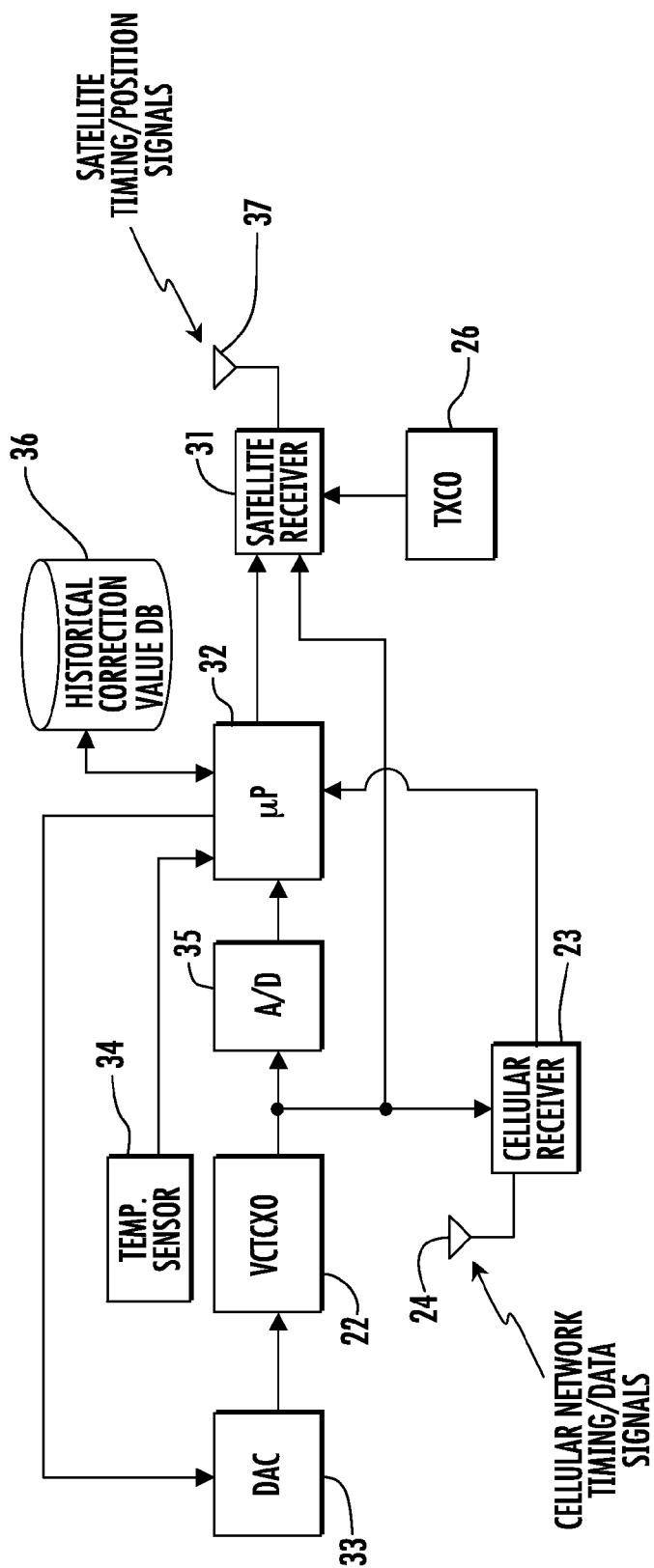
FIG. 2 is a schematic block diagram of an exemplary embodiment of the clock correction circuitry of the wireless communications device of FIG. 1.

Referring now more particularly to FIG. 2, the various components and operation of the clock correction circuitry 27 are further described. In the illustrated embodiment, the wireless communications device 20 is a cellular device and the receiver 23 is a cellular receiver (which may be part of a cellular transceiver, for example). The device 20 also illustratively includes a satellite positioning receiver 31 and associated antenna 37 for receiving satellite positioning signals, such as Global Positioning System (GPS) signals. However, it will be appreciated by those skilled in the art that other satellite positioning systems, such as GLONASS, Galileo, EGNOS, Beidou, etc., may also be used. Accordingly, in the present embodiment a user is provided with cellular service as well as satellite navigation capabilities all from a single wireless communications device.

In the present example, the temperature-compensated clock circuit 22 is a voltage-controlled temperature-compensated clock circuit, such as a voltage-controlled temperature-compensated crystal oscillator (VCTCXO), and the satellite positioning clock circuit 26 is a temperature-compensated crystal oscillator (TCXO). Moreover, a microprocessor 32 connected to the cellular receiver 23 for controlling the VCTCXO 22 based upon the timing signals received from the cellular network. More particularly, digital control signals from the microprocessor 32 are converted to analog control signals for the VCTCXO 22 by a digital-to-analog converter (DAC) 33.

As discussed briefly above, cellular networks provide very accurate timing information that can be used by the processing circuitry of a cellular device to enhance the accuracy of the satellite clock signal used by the satellite receiver 31. This process is generally referred to as frequency aiding, and further information on this approach may be found in the above-noted U.S. Pat. No. 6,741,842, which is hereby incorporated herein in its entirety by reference.

Yet, there are circumstances when cellular network timing signals are unavailable to the device 20, such as when the device is out of a coverage area, there is a network outage, or the user has turned off the cellular receiver 23, for example. Moreover, GPS receiver circuitry, for example, requires a very accurate clock reference in order to perform correlation. The more accurate the clock, the faster the Time To First Fix (TTFF). Network aiding data (A-GPS) is usually provided to the GPS unit to narrow the search window in order to improve TTFF, but when no aiding data or cellular network timing signals are available then an autonomous TTFF may be very long.

To provide faster TTFFs in such conditions, the device 20 also advantageously includes a temperature sensor 34, preferably positioned adjacent the VCTCXO 22, and providing an input to the microprocessor 32. Furthermore, an analog-to-digital (A/D) converter samples the analog frequency output of the VCTCXO 22 to provide a digital input to the microprocessor 32. An A/D converter (not shown) may also be connected between the temperature sensor 34 and the microprocessor 32. When the device 20 has network timing information (either from a cellular base station or from GPS satellites, depending upon the given implementation), the microprocessor 32 self-calibrates the VCTCXO and builds a logical table of VCTCXO performance to temperature based upon the temperature data provided by the temperature sensor 34 and the corresponding voltage control level output to the DAC 33. That is, the values stored in the table provide an indication as to how far the VCTCXO 22 has drifted from its center frequency based on historical measurements.

The historical correction data may be stored in a memory 36, which in FIG. 2 is illustratively shown as a database module. In this way, the microprocessor 32 utilizes a deterministic approach to control the VCTCXO 22 based upon on temperature when no network timing signals are available, and can therefore provide a more accurate reference for the satellite receiver 31 and improve TTFF.

The offset correction for the VCTCXO 22 may be used in different ways to improve the accuracy of the TXCO 26 clock signal for the satellite receiver 31. In the illustrated example, the microprocessor 22 provides an offset correction output directly to the GPS receiver 31, which includes the requisite internal processing circuitry to compensate the TXCO 26 clock signal based upon the offset correction from the microprocessor 32 and the output of the VCTCXO 22.

In an alternative embodiment now described with reference to FIG. 3, the outputs of the VCTCXO 22 and TXCO 26 may be input to a frequency correction circuit 40' along with the offset correction output from the microprocessor 32', which in turn can provide the satellite reference clock signal to the satellite receiver 31'. More particularly, in this embodiment the frequency correction circuit 40' includes a frequency comparator which compares a difference between the output frequencies of the VCTCXO 22' and TXCO 26', and a correction circuit which adjusts the TXCO output based upon the difference between the frequencies and the offset correction from the microprocessor 32', as will be appreciated by those skilled in the art. An exemplary frequency comparator/correction circuit configuration which may be used for this purpose is provided in the above-noted U.S. Pat. No. 6,741,842, for example.

Figure 3:
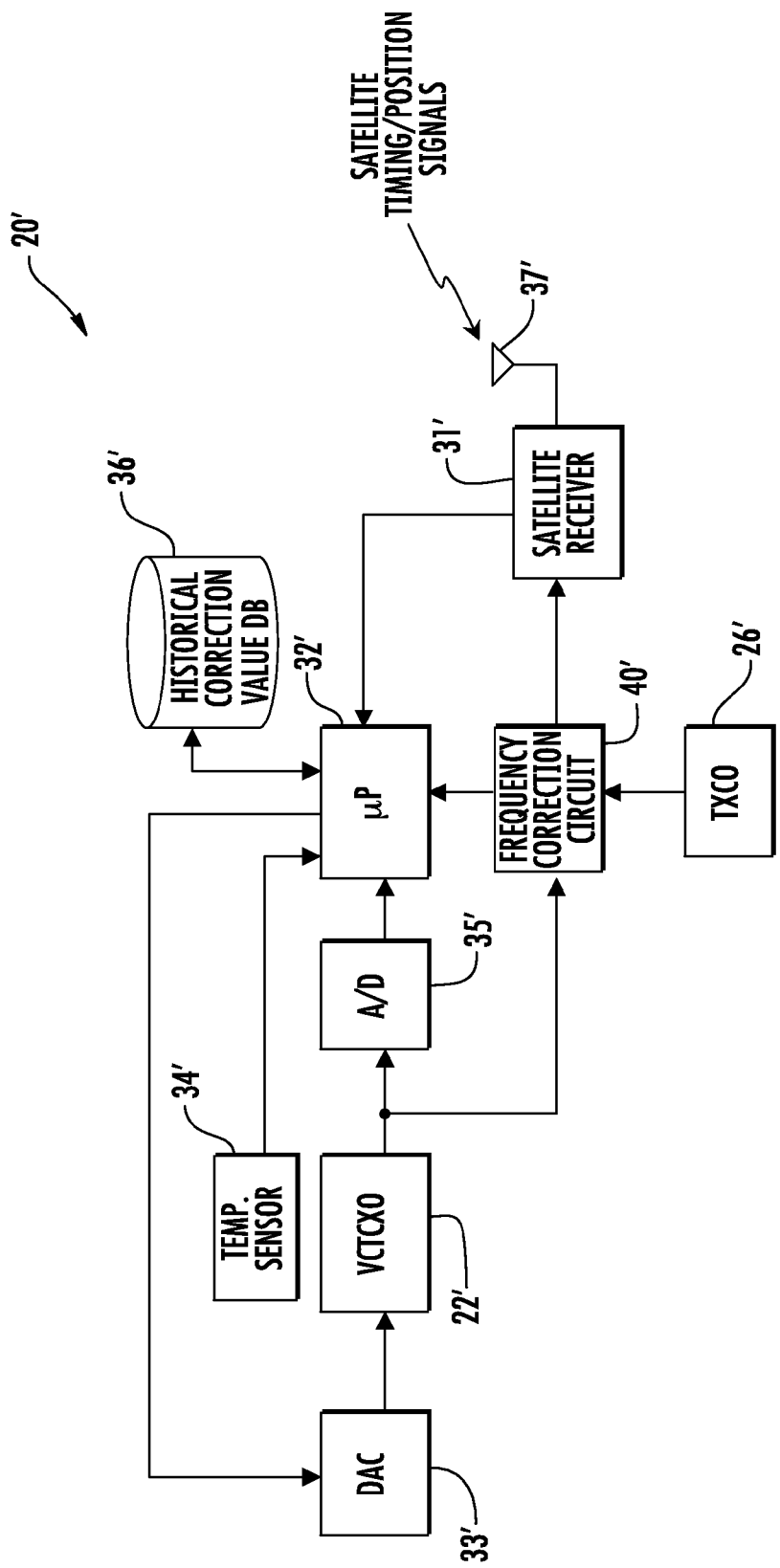
FIG. 3 is a schematic block diagram of an alternative exemplary embodiment of the clock correction circuitry of the wireless communications device of FIG. 1.

It should also be noted that in the embodiment shown in FIG. 3 there is no cellular receiver 23, only the satellite positioning receiver 31'. That is, this embodiment is directed to a handheld satellite positioning device without cellular capabilities. Thus, in this embodiment, the timing signals that are used for generating the historical correction values and calibrating the VCTCXO 22' are provided by the satellite positioning network. Thus, the VCTCXO 22' need not necessarily provide a frequency used for a cellular reference clock (which may be about 16.8 MHz, for example), but instead could take other values as well. By way of example, a typical reference clock oscillator frequency for a GPS receiver may be about 24.5535 MHz, although other frequencies may be used in different embodiments.

Figure 4:
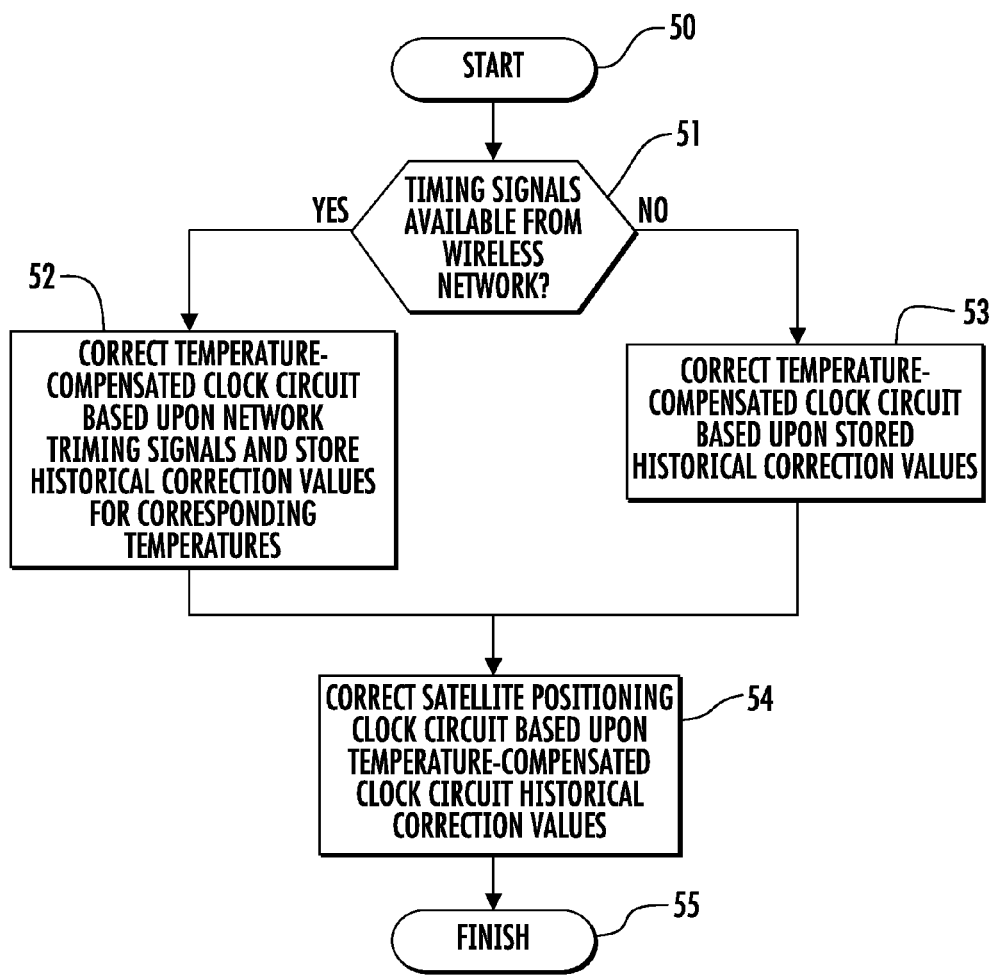
FIG. 4 is a flow diagram illustrating a clock correction method for a wireless communications device including a satellite positioning clock circuit in accordance with an exemplary embodiment.

Turning now additionally to FIG. 4, a clock correction method for the wireless communications device 20 is now discussed. Beginning at Block 50, when timing signals are available from the wireless network 25, at Block 51, the temperature-compensated clock circuit 22 is corrected based the timing signals, and historical correction values for corresponding temperatures are stored, at Block 52. However, when timing signals are unavailable from the wireless network 25, the temperature-compensated clock circuit 22 is corrected based upon the stored historical correction values, at Block 53, as discussed further above. In either case, the satellite positioning clock circuit 26 is corrected based upon the corrected temperature-compensated clock circuit, at Block 54, thus concluding the illustrated method. Of course, it will be appreciated that in actual operation the step illustrated at Block 51 would be repeated after the step illustrated at Block 54.

Figure 5:
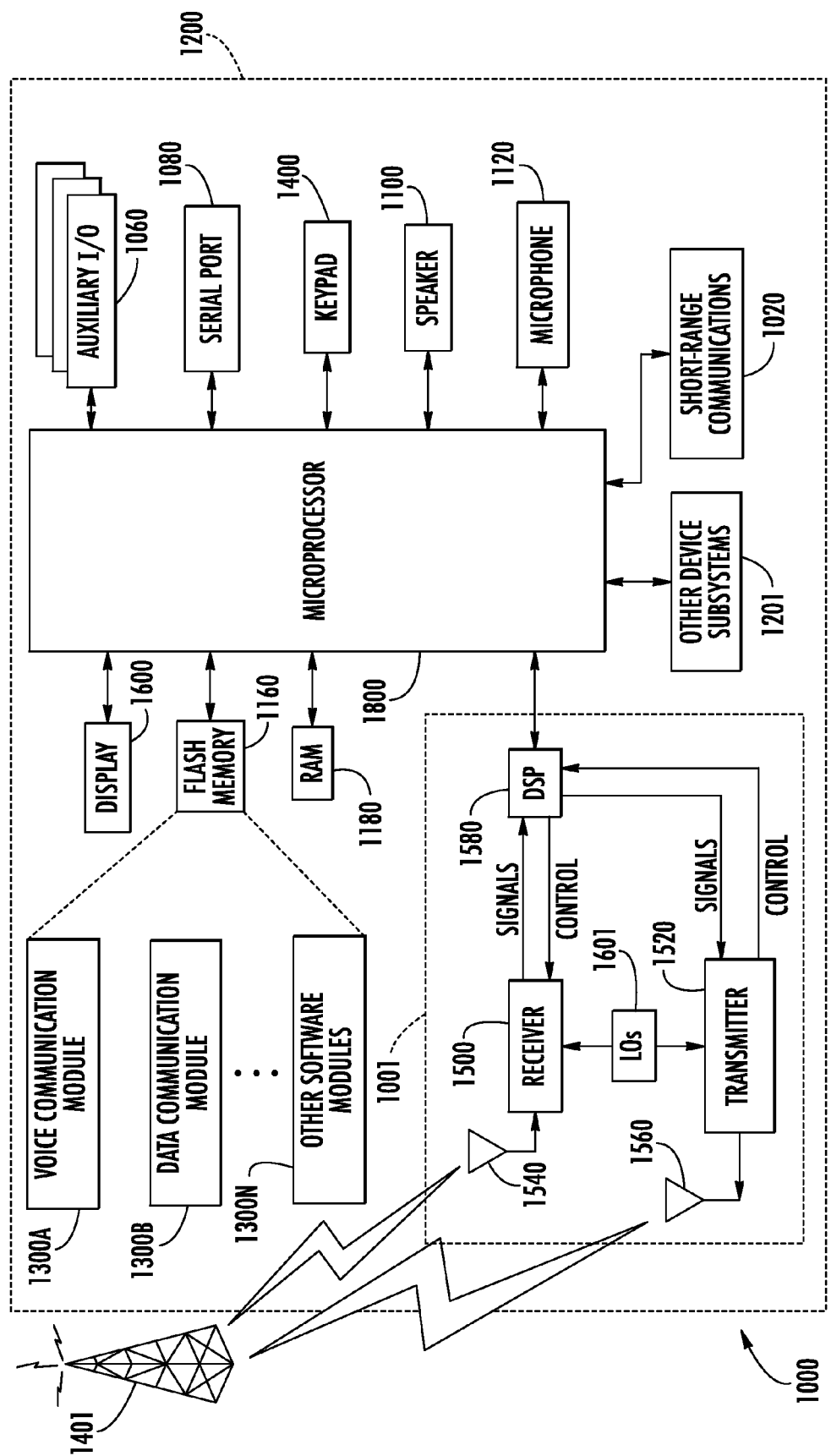
FIG. 5 is a schematic block diagram illustrating additional exemplary components that may be included in the mobile wireless communications device of FIG. 1.

Other exemplary components that may be used in the device 20 are now further described with reference to a handheld mobile wireless communications device 1000 as shown in FIG. 5. The device 1000 illustratively includes a housing 1200, a keypad 1400 and an output device 1600. The output device shown is a display 1600, which is preferably a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user.

The housing 1200 may be elongated vertically, or may take on other sizes and shapes (including clamshell housing structures). The keypad may include a mode selection key, or other hardware or software for switching between text entry and telephony entry.

In addition to the processing device 1800, other parts of the mobile device 1000 are shown schematically in FIG. 5. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (RON) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A wireless communications device comprising:
   a portable housing;
   a temperature-compensated clock circuit carried by said portable housing;
   a cellular wireless receiver carried by said portable housing, coupled to said temperature-compensated clock circuit and configured to receive timing signals, when available, from a cellular wireless network;
   a satellite positioning receiver carried by said housing and configured to receive satellite positioning signals;
   a satellite positioning clock circuit carried by said portable housing and coupled to said satellite positioning receiver;
   a temperature sensor; and
   at least one clock correction circuit carried by said portable housing and coupled to said temperature sensor for
      correcting said temperature-compensated clock circuit based upon timing signals from the cellular wireless network when available, and storing historical correction values for corresponding temperatures,
      correcting said temperature-compensated clock circuit based upon the stored historical correction values when timing signals are unavailable from the cellular wireless network, and
      providing an offset correction signal to said satellite positioning receiver based upon said temperature-compensated clock circuit.

2. The wireless communications device of claim 1 wherein said temperature-compensated clock circuit comprises a voltage-controlled temperature-compensated clock circuit; and wherein the historical correction values comprise voltage correction values for said voltage-controlled temperature-compensated clock circuit.

3. The wireless communications device of claim 1 wherein said at least one clock correction circuit comprises a processor.

4. The wireless communications device of claim 1 wherein said satellite positioning clock circuit comprises a temperature-compensated crystal oscillator (TCXO).

5. The wireless communications device of claim 1 further comprising an analog-to-digital converter coupled between said temperature-compensated clock circuit and said at least one clock correction circuit.

6. The wireless communications device of claim 1 further comprising a digital-to-analog converter (DAC) coupled between said at least one clock correction circuit and said temperature-compensated clock circuit.

7. A clock correction method for a wireless communications device comprising a portable housing, a temperature-compensated clock circuit carried by the portable housing, a temperature sensor carried by the portable housing adjacent the temperature-compensated clock circuit, a cellular wireless receiver carried by the portable housing for receiving timing signals, when available, from a cellular wireless network, a satellite positioning receiver carried by the portable housing and configured to receive satellite positioning signals, and a satellite positioning clock circuit carried by the portable housing and coupled to the satellite positioning receiver, the method comprising:
   when timing signals are available from the cellular wireless network, correcting the temperature-compensated clock circuit based upon the timing signals and storing historical correction values for corresponding temperatures;
   when timing signals are unavailable from the cellular wireless network, correcting the temperature-compensated clock circuit based upon the stored historical correction values; and
   providing an offset correction signal to the satellite positioning receiver based upon the temperature-compensated clock circuit.

8. The method of claim 7 wherein correcting the temperature-compensated clock circuit comprises correcting a voltage-controlled temperature-compensated clock circuit; and wherein storing the historical correction values comprises storing voltage correction values for the voltage-controlled temperature-compensated clock circuit.

9. The method of claim 7 wherein correcting the satellite positioning clock circuit comprises correcting a temperature-compensated crystal oscillator (TCXO).

* * * * *